(12) United States Patent
Kim et al.

(10) Patent No.: US 9,532,312 B1
(45) Date of Patent: Dec. 27, 2016

(54) LOCATING USER DEVICE USING BEACON SIGNAL

(71) Applicant: AMAZON TECHNOLOGIES, INC., Reno, NV (US)

(72) Inventors: Jin Dong Kim, Cupertino, CA (US); Arvind Thiagarajan, Cambridge, MA (US)

(73) Assignee: Amazon Technologies, Inc., Reno, NV (US)

( * ) Notice: Subject to any disclaimer, the term of this patent is extended or adjusted under 35 U.S.C. 154(b) by 459 days.

(21) Appl. No.: 14/089,618

(22) Filed: Nov. 25, 2013

(51) Int. Cl.
*G08C 17/00* (2006.01)
*H04W 52/02* (2009.01)

(52) U.S. Cl.
CPC ................ *H04W 52/0277* (2013.01)

(58) Field of Classification Search
CPC .................................. H04W 52/0277
USPC ........................................... 370/311
See application file for complete search history.

(56) References Cited

U.S. PATENT DOCUMENTS

| | | | | |
|---|---|---|---|---|
| 2002/0123345 | A1* | 9/2002 | Mahany | H04W 48/08 455/432.1 |
| 2008/0311961 | A1* | 12/2008 | Cotevino | H04W 4/16 455/574 |
| 2009/0047958 | A1* | 2/2009 | Rimhagen | H04J 11/0093 455/436 |
| 2011/0006739 | A1* | 1/2011 | Chishima | H04W 52/0261 320/136 |
| 2011/0055338 | A1* | 3/2011 | Loeb | B60R 22/34 709/206 |
| 2013/0250814 | A1* | 9/2013 | Choi | H04L 1/1692 370/255 |

* cited by examiner

*Primary Examiner* — Peter Cheng
(74) *Attorney, Agent, or Firm* — Lindauer Law, PLLC

(57) ABSTRACT

A misplaced user device deactivates processors and other resources so as to conserve residual battery power, while a radio frequency (RF) circuit remains active. The RF circuit transmits a beacon signal at time intervals to aid a user in locating and recovery of the misplaced user device by way of another user device operating in search mode. Information regarding the identity or other characteristics of the misplaced user device may be encoded in the beacon signal to assist in the search. The misplaced user device may modify the beacon signaling RF power, time intervals, information, or other parameters in response to an acknowledgement signal received from the searching user device.

20 Claims, 8 Drawing Sheets

LOCATING USER DEVICE USING BEACON SIGNAL

BACKGROUND

It is desirable to locate misplaced tablet computers, wearable computers, cellular phones, and other portable user devices. Methods and apparatus for recovering lost or misplaced devices are continually sought after.

Figure 1:
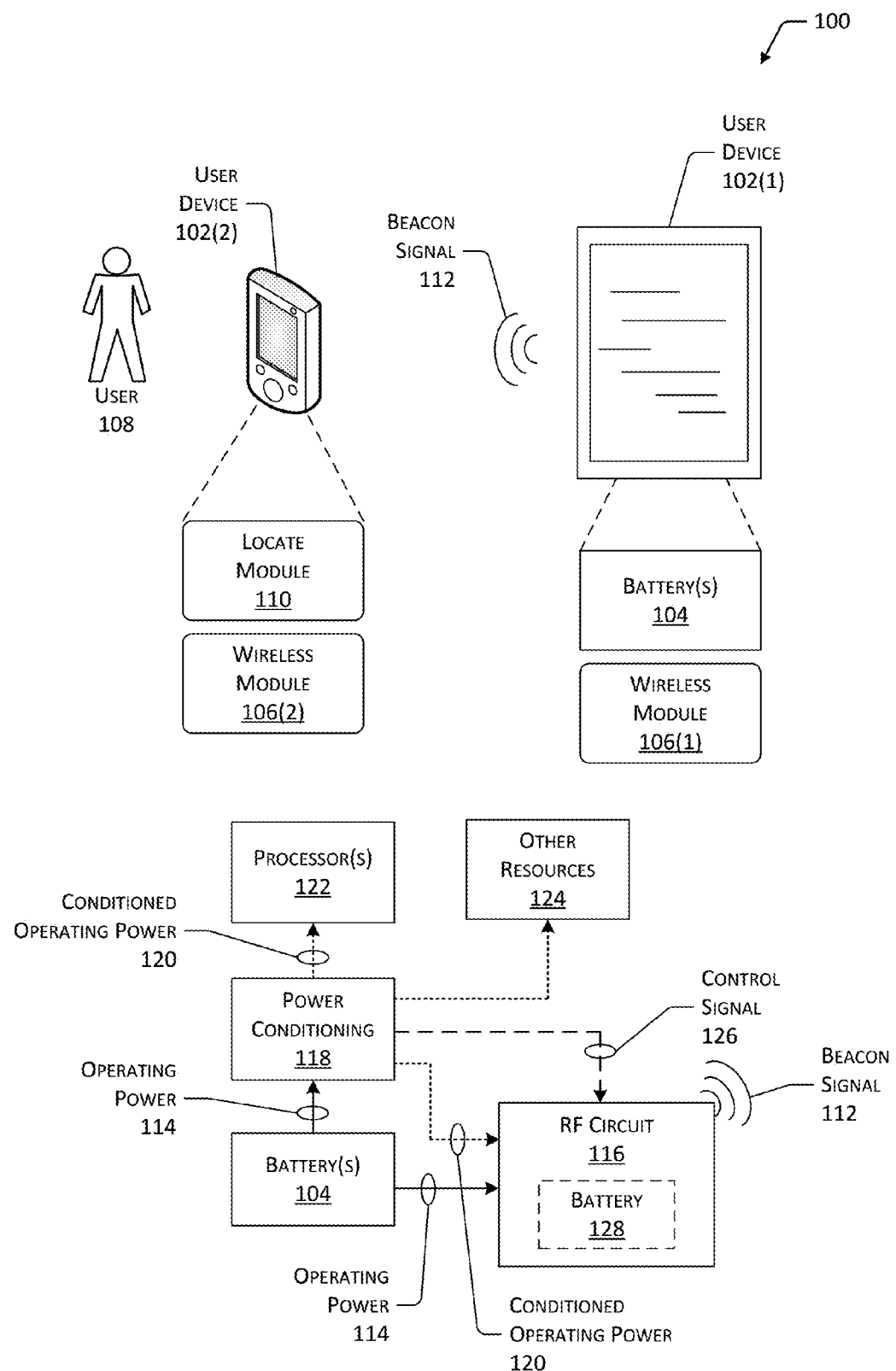
FIG. 1 depicts views including user devices and resources used to locate a misplaced user device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Portable user devices are utilized in many areas of endeavor. Cellular telephones, tablet computers, wearable computers having eyewear- or wristwatch-like form factors, media access or viewing devices, e-book readers, and the like are just a few examples. Such user devices perform various respective functions and are battery powered for operation in a mobile manner.

Unfortunately, such user devices are sometimes misplaced owing to their relatively compact sizes and shapes. Worse yet, a person may unwittingly leave their user device behind within a taxicab, transit railcar, aircraft, or other vehicle such that relocation and recovery are relatively difficult due to the mobile nature of the venue. Furthermore, these and other public locations are such that the user device may be found by someone unwilling to return it to its rightful owner.

Portable user devices are often designed to automatically discontinue most or all operations once the voltage of their battery or batteries drops below a threshold value. Such shut down operations are usually performed in the interest of protecting the battery against permanent damage or performance degradation that can occur as a result of excessive electrical discharge. Nonetheless, batteries often contain a residual quantity of energy that may be safely used with little or no significant damage to the battery, even after the voltage of the battery as dropped below a protective threshold value.

In more extreme cases, recovery of the user device is of paramount concern due to file contents stored therein or other considerations, regardless of any permanent damage to the battery. That is, the cost or inconvenience of replacing a damaged battery is a secondary consideration in view of the unique resources or sensitive information content of the user device. Thus, such residual energy within the battery may be applied to locating and recovery of the user device for as long as the corresponding resources can operate.

In one illustration, a user device includes a radio frequency (RF) circuit or other wireless resource configured to send, or transmit, a beacon signal to aid in locating the user device. The beacon signal may include information regarding the user device such as an identification number or code, a present battery voltage value, an RF power used in transmitting the signal, or other useful data. The beacon signal may be sent at time intervals of any suitable period, so as to reduce overall energy consumption. Thus, such a beacon signal may be sent once every minute, once every two minutes, and so on. The beacon signal may be an un-modulated carrier wave, modulated or encoded, or exhibit other characteristics.

Continuing the present illustration, transmission of the beacon signal may be triggered in response to sensing that the voltage of the user device battery has dropped below a first threshold level. The RF circuit may be configured to sense this voltage drop directly, or it may receive a related trigger signal from a processor, a power conditioning circuit, or some other resource of the user device. One or more other resources of the user device, such as an application processor, display, audio resources, and the like may be controllably shut down in response to the first threshold voltage level, or fail to operate due to the decreased battery voltage level. The RF circuit may therefore continue transmitting the beacon signal while most or all other resources of the user device have been inactivated to protect the battery or conserve power.

Another user device or other apparatus may be equipped to search for a lost user device by sensing the beacon signal and providing corresponding indications to a user. For example, a user device in "search mode" may visually, audibly, or haptically indicate to a user when the beacon signal is detected. The searching user device my also indicate or display information provided by the beacon signal such as an identity of the "lost" user device, an estimated range to the user device based on RF power level information, and so forth. The searching user device may also be configured to acquire a last known location or other information about the lost user device. This information may be acquired from the lost user device, a server, or other network-based resource, if such information is available.

In the ongoing illustration, the RF circuit may continue sending the beacon signal at time intervals of a first rate—for instance, one beacon signal transmission every minute. The RF circuit may also be configured to receive an acknowledgment signal from the searching user device, the acknowledgement signal transmitted in response to detection of the beacon signal. In turn, the RF circuit may respond by transmitting the beacon signal at time intervals of a second rate—for instance, one beacon signal transmission every twenty seconds or so. This quickened beacon signaling pace may assist the searching party such that recovery of the misplaced user device occurs in less time.

Further to the illustration, the RF circuit may be configured to discontinue sending the beacon signal once the battery voltage falls below a second threshold value that is lesser than the first. In this way, the battery or batteries of the user device may be protected against some measure of damage or performance degradation. In another example, the battery may be considered expendable and the RF circuit may continue to transmit the beacon signal until cessation due to insufficient residual battery power.

As such, respective user devices may be configured to transmit a beacon signal while operating from residual power stored within a battery. The beacon signaling may be performed while numerous other resources of the user device—most notably, application processors—are de-energized. Respective variations on the foregoing may also be used in accordance with the methods, devices, and systems described herein.

"De-energized", as that term is used herein, refers to an element, component, circuit, or system that is inoperative and as such draws little or no electrical energy. Thus, a de-energized state is one in which the corresponding object is performing none of its normal functions or processes. However, a de-energized object may still be consuming electrical current at a non-zero rate. For a non-limiting example, an application processor may continue to draw electrical current on a small scale while de-energized.

FIG. 1 depicts views 100 of a system including particular elements and operations performed by each. The views 100 are illustrative and non-limiting in nature, and other elements, devices, systems, or respective operations are also contemplated.

A user device 102(1) is depicted as a tablet computer having a portable form-factor and configured to perform various operations in accordance with an executable program code. Other user device 102 types or configurations, such as e-book readers, smart phones, wearable computers, laptop computers, and so forth, may also be used. The user device 102(1) includes a battery 104 configured to provide operating power to various resources of the user device 102(1). In one example, the battery 104 is a rechargeable type such as lithium-ion (Li-ion) or other suitable variety.

The user device 102(1) may also be configured to communicate with other apparatus and systems using a wireless module 106(1). The wireless module 106(1) may include a radio frequency (RF) circuit defining a transmitter, transceiver, or other suitable configuration. The user device 102(1) may operate in a mobile manner, performing various operations in respective locations and at various times, and communicating with other user devices 102 or services by way of the wireless module 106(1).

Also depicted is a user device 102(2) associated with a user 108. For purposes of illustration, the user device 102(2) is depicted as a cellular telephone or "smart phone" configured to perform various operations in accordance with an executable program code. The user device 102(2) includes a wireless module 106(2) configured to communicate information, data or signals with other user devices 102, or apparatus by way of wireless signaling.

The user device 102(2) also includes a locate module 110. The locate module 110 may include electronic circuitry, a processor, RF circuitry or devices, executable program code stored on non-transitory computer readable storage media (CRSM), or other suitable constituency. The locate module 110 may assist the user 108 in searching for the user device 102(1) if it is misplaced, or is taken by a malicious party. Specifically, the locate module 110 may be configured to sense or "listen" for a wireless beacon signal 112 transmitted by the user device 102(1) and to provide corresponding indications to the user 108.

Further depicted are illustrative elements that may be provided by a user device 102, such as the user device 102(1) or 102(2), or both. The battery 104 provides operating power 114 to one or more resources. An RF circuit 116 may be configured to provide the beacon signal 112 as introduced above. The RF circuit 116 may be included within the wireless module 106. In one embodiment, the RF circuit 116 may receive operating power 114 directly from the battery 104. The RF circuit 116 may be provided, at least in part, by a dedicated purpose integrated circuit, by circuitry including discrete components, or by other suitable constituency.

In one instance, the RF circuit 116 is configured to provide the beacon signal 112 in accordance with a short-range wireless signaling protocol, such as in accordance with the Institute of Electrical and Electronic Engineers (IEEE) standards 802.11. For instance, signaling protocols such as Wi-Fi® or Bluetooth® may be used. Wi-Fi is a registered trademark owned by Wi-Fi Alliance, Austin, Tex., USA. Bluetooth is a registered trademark owned by Bluetooth SIG, Inc., Kirkland, Wash., USA. Other wireless signaling protocols may also be used.

By "directly from the battery", it is meant that the RF circuit 116 is connected to the battery 104 by wires, circuit pathways, or other constructs such that the operating power 114 is characterized by the instantaneous output, or terminal, voltage of the battery 104. As such, no current limiting, voltage regulation or adjustment, or other power conditioning is performed on the operating power 114.

The user device 102 may also include power conditioning 118. The power conditioning 118 may include electronic circuitry, a controller, executable program code, or other constituency. The power conditioning 118 is configured to receive operating power 114 directly from the battery 104 and to provide conditioned operating power 120 to other respective resources. The conditioned operating power 120 may be characterized by voltage regulation, voltage reduction or boosting, current limiting, noise or interference filtering, or other attributes. In one embodiment, the RF circuit 116 may receive conditioned operating power 120 from the power conditioning 118 in lieu of operating power 114 received directly from the battery 104. In yet another embodiment, the RF circuit 116 may receive both conditioned operating power 120 and operating power 114.

The user device 102 may also include one or more processors 122. Each processor 122 may be configured to perform various respective operations or functions in accordance with an executable program code. Thus, any particular processor 122 may perform operations commensurate with running an application defined and configured by way of program code. The one or more processors 122 are also configured to receive conditioned operating power 120 from the power conditioning 118.

The user device 102 may also include one or more other resources 124. Non-limiting examples of such other resources 124 include a display, audio input or output, a camera, a satellite navigation receiver, cellular communications resources, and so forth. The one or more other resources 124 may be respectively or collectively configured to receive conditioned operating power 120 from the power conditioning 118.

The power conditioning 118 may also be configured to sense or measure the voltage provided by the battery 104 and to provide a corresponding control signal 126. The control signal 126 may be indicative of the battery 104 voltage, or may be asserted or encoded in response to respective voltage threshold values. For instance, the control signal 126 may be asserted or encoded when the battery 104 voltage drops below a first threshold value such as 3.3 volts direct-current (VDC). The control signal 126 may be otherwise asserted or encoded when the battery 104 voltage drops or falls below a second threshold value such as 2.9 VDC. Other threshold voltage values, indications, or data may be communicated by way of the control signal 126.

Optionally, the RF circuit 116 may include a battery 128 that is used to power the RF circuit 116 during transmission of the beacon signal 112. As such, the RF circuit 116 would not draw energy from the battery or batteries 104 for beacon signal 112 transmission or other "lost mode" purposes. In one instance, such an RF circuit 116 may be triggered into transmitting the beacon signal 112 by way of the control signal 126. In another instance, the RF circuit 116 may transmit the beacon signal 112 at all times. The battery 128 may be a disposable type, or may be a rechargeable type that is replenished when the user device 102 is coupled to a source of electrical energy, such as a power supply. Other respective variations may also be used.

Illustrative and non-limiting operations of the elements of the views 100 are as follows: The user 108 operates the user device 102(1) in a location such as an office space during the course of a workday. For purposes of the illustration, it is assumed that the user 108 intends to take the user device 102(1) home after normal working hours to continue efforts on a project. However, the user 108 absentmindedly sets the user device 102(1) down in a neighboring office of a colleague while discussing work details. The user 108 then leaves for home without the misplaced user device 102(1).

In the present illustration, the user 108 arrives home and after a while realizes that the user device 102(1) is not present with the other materials that they brought home from work. The user 108 then returns to their work location to search for the misplaced user device 102(1). The user 108 activates a locating application—part of the locate module 110—on the user device 102(2) to aid them in tracking down the misplaced user device 102(1).

Meanwhile, the battery 104 of the misplaced user device 102(1) has dropped in voltage below a first threshold value of 3.3 VDC. The power conditioning 118 has communicated this voltage drop to the processor(s) 122, which have responded by causing the other resources 124 and the processor(s) 122 to assume a shutdown condition. The power conditioning 118 also asserts the control signal 126 in accordance with the battery 104 voltage drop below the first threshold value.

Continuing the present illustration, the RF circuit 116 responds to the control signal 126 by transmitting the beacon signal 112, including an identity code for the user device 102(1) and an RF power level being used to transmit the beacon signal 112. For example, each beacon signal 112 transmission may include an identity code "1234ZXT77", and an RF power level of "0.2 Watts". Each respective transmission is relatively brief in time and is performed in one minute intervals. Thus, the beacon signal 112 is being transmitted sixty times per hour at the present rate.

In the present illustration, the searching user device 102(2) detects the beacon signal 112 and alerts the user 108 by a corresponding indication on a display. An audible "ping" or other sound may also be provided in the interest of additional user 108 awareness. The searching user device 102(2) also compares the 0.2 watts RF power level data with a measured power level for the detected beacon signal 112. The locate module 110 interprets the comparison of the respective RF power data and measurements, and calculates an estimated range of 24.0 feet to the misplaced user device 102(1). The estimated range is then presented on the display of the user device 102(2).

The user 108 considers the estimated range value in recollection of the details of their workday, and determines that the misplaced user device 102(1) is likely in the neighboring colleague's office, or in a break room area nearby. The user 108 then proceeds toward those respective locations, arriving at the break room first and conducting a visual search of that area.

Further to the present illustration, another beacon signal 112 transmission is sensed by the searching user device 102(2) while the user 108 is surveying the break room. Visible and audible indications of the just-detected beacon signal 112 are provided, and a new estimated range value of 8.4 feet is presented. The user 108 recognizes that this new range corresponds to the colleague's office across the hallway from the break room and proceeds thereto.

In conclusion of the present illustration, the misplaced user device 102(1) is located and retrieved immediately after entry into the colleague's office space. The user 108 then momentarily touches a "search done" control presented on the display of the searching user device 102(2), resulting in the transmission of a notification signal to the user device 102(1). The RF circuit 116 responds to the notification signal by ceasing transmission of the beacon signals 112.

Figure 2:
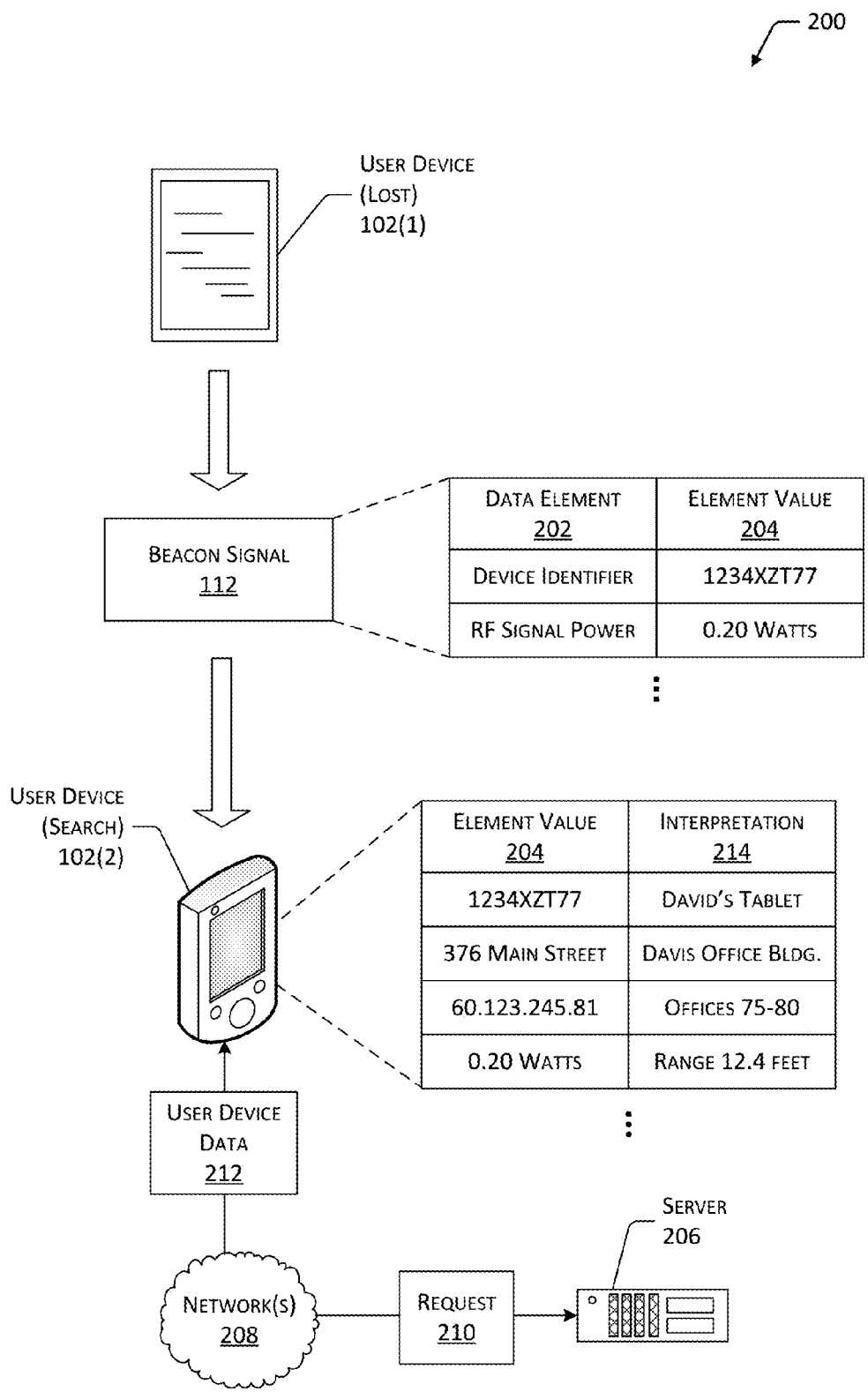
FIG. 2 illustrates respective user devices and information that is used while one user device is used to search for the other.

FIG. 2 depicts views 200 that include operations and information regarding the locating of a user device 102(1) that has been lost or misplaced. The views 200 are illustrative and non-limiting in nature. Other implementations and variations may also be used.

The user device 102(1), illustrative of a lost user device 102, is configured to transmit the beacon signal 112. Specifically, the RF circuit 116 of the wireless module 106(1) is configured to send the beacon signal 112 at controlled time intervals. The beacon signal 112 includes information or data regarding the user device 102(1), as depicted for purposes of non-limiting illustration.

Data elements 202 and their respective element values 204 are depicted. A first data element 202 is a "DEVICE IDENTIFIER", having an element value 204 of "1234XZT77". In turn, a second data element 202 is an "RF SIGNAL POWER", having an element value 204 of "0.20 Watts". Thus, two pieces of data regarding the user device 102(1) are or encoded within, or communicated by, the beacon signal 112.

The user device 102(2) serves as a search user device 102, and is configured to detect the beacon signal 112 by operation of the wireless module 106(2). The locate module 110 of the user device 102(2) provides for various search-related operations and functions by way of executable program code, circuitry, or other resources. The locate module 110 may also allow the user 108 to request information regarding the lost user device 102(1) from a server 206 by way of one or more networks 208, such as the Internet and so forth.

The server 206 may be configured to acquire and store data related to one or more respective user devices 102, such as a most recently determined geographic location, a present or most recent network 208 connection or wireless access point, a user-given name for the user device 102, an identification code or serial number, a model number, a present configuration or resource manifest, and so forth. Other user device 102 data may also be acquired and stored as a centralized service of the server 206, or by one or more respective servers 206 in the course of providing various respective services.

The search user device 102(2) may send a request 210 to the server 206, seeking data regarding the lost user device 102(1). Such a request 210 may be issued once the user 108 is aware that the user device 102(1) has been misplaced, and as a first step in the search and recovery process. The server 206 receives the request 210, which may identify the user 108 and include a serial number or other identifying information specific to the lost user device 102(1). The server 206 accesses a data structure or other data and retrieves stored information regarding the lost user device 102(1), which is sent as user device data 212 by way of the networks 208.

The search user device 102(2) receives the user device data 212 that includes, for purposes of non-limiting illustration, respective element values 204 of "376 MAIN STREET" and "60.123.245.81". In another instance, the search user device 102(2) has previously stored, or cached, one or more of the element values 204, including most recent known location information for the lost user device 102(1). Such cached element values 204 may be acquired during communication between the respective user devices 102(1) and 102(2), either directly or by way of the network(s) 208. Other modes by which element values 204 may be acquired may also be used.

The locate module 110 operates to process or interpret the respective element values 204 as received with the user device data 212 and to display corresponding interpretations 214 to the user 108. For instance, the user device data 212 may indicated to the locate module 110 that the most recent known location for the lost user device 102(1) is "376 MAIN STREET". The locate module 110 may reference or interpret that street address as the "DAVIS OFFICE BUILDING", and present both the element value 204 and the interpretation 214 on a display for the user 108.

The locate module 110 may also access stored or wirelessly available network 208 address information to determine that the Internet protocol (IP) address of "60.123.245.81" corresponds to a wireless access point serving office numbers 75 through 80 within the "DAVIS OFFICE BUILDING". In turn, these respective element values 204 and their interpretations 214 are presented on the display of the search user device 102(2).

Thus, the user 108 has initial information from which to start searching for the lost user device 102(1). The user 108 then proceeds to the Davis Office Building and begins their electronic search in the hallway serving offices 75-80. The wireless module 106(2) of the search user device 102(2) operates to sense for the beacon signal 112. Once the beacon signal 112 is detected, the wireless module 106(2) communicates element values 204 encoded within the beacon signal 112 to the locate module 110 of the search user device 102(2). The locate module 110 interprets or processes these element values 204 and displays corresponding interpretations 214 to the user 108.

Specifically, the locate module 110 associates the Device Identifier value of "1234XZT77" with the user-given name of "DAVID'S TABLET". The locate module 110 also compares the RF Signal Power value of "0.20 Watts" with a measured signal strength for the beacon signal 112 and calculates an estimated range of 12.4 feet to the lost user device 102(1). The user 108 reviews the displayed interpretations 214 and, in consideration of their present location in the hallway, determines that the lost user device 102(1) is likely either in office number 77 or 78. For purposes of illustration, the user 108 successfully locates and recovers the lost user device 102(1) within office number 77.

The foregoing scenario illustrates some of the data element 202 types and element values 204 that may be used to aid a user 108 in locating and recovering a misplaced user device 102. Other data types and their respective values may also be used. For instance, a search user device 102 may not be able to acquire geographic location data or last-known network access information for a lost user device 102. Thus, a user 108 would likely begin their locating efforts at the various places that they visited within a relevant historic timeframe.

From another perspective, the RF power level of the beacon signal may be boosted or adjusted during the transmission of additional data or information during each Nth iteration. For example, a misplaced user device 102 may have some most recent geographic location data for itself—say, by way of satellite navigation, cellular locating, or another technique—despite the fact that the corresponding resources have been inactivated in the interest of battery protection and power conservation. The RF circuit 116 may be configured to increase the RF broadcast power during each 10th transmission and encode the most recent geographic location data within the beacon signal 112, returning to a lower RF power level during the other 9 beacon signal 112 transmissions in that sequence. In this way, an energy conserving approach may be taken, while improving the chances of relocation and recovery by (potentially) greatly reducing the search area that the user 108 must deal with. Other strategies and techniques may also be used.

Figure 3:
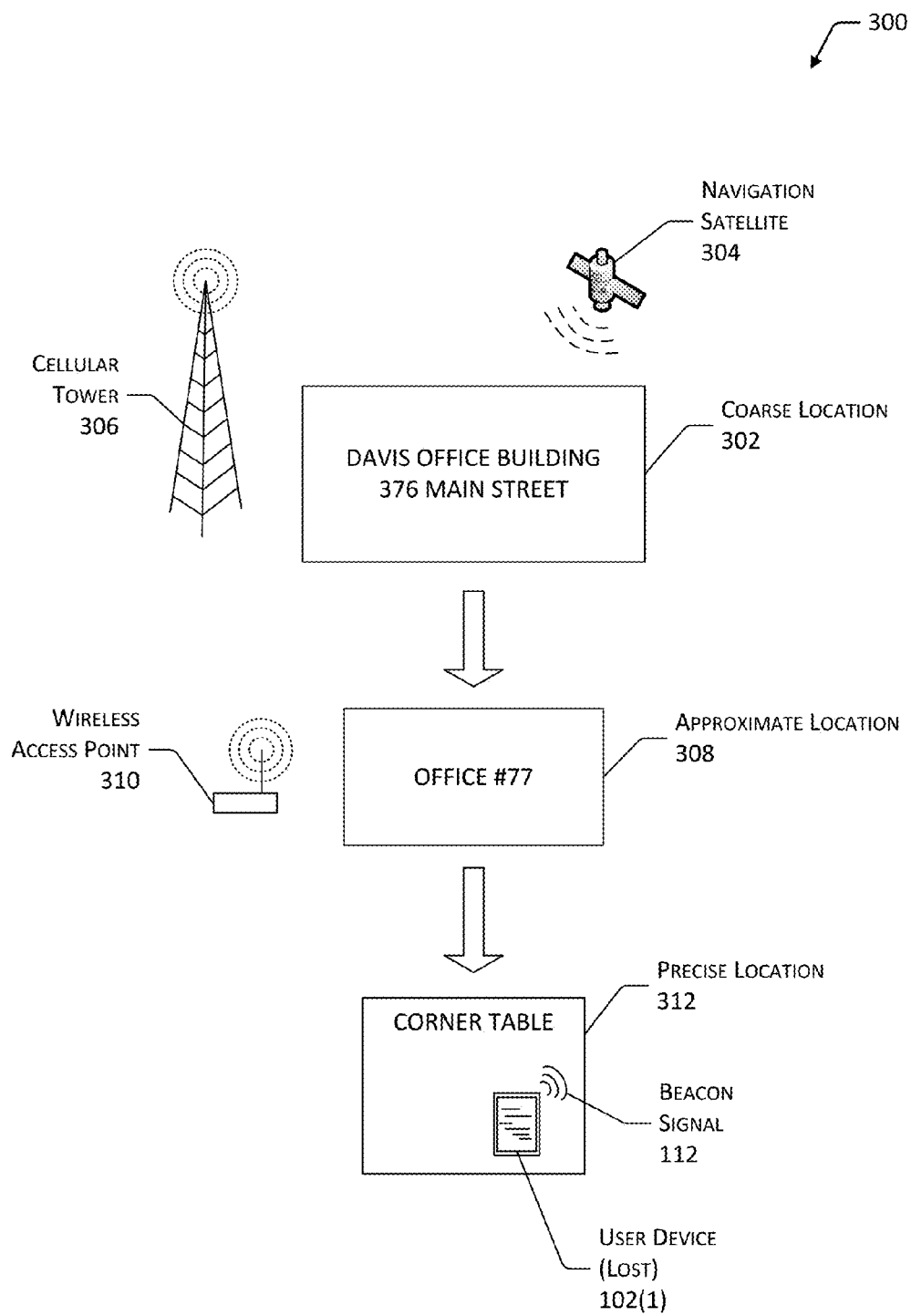
FIG. 3 illustrates locations and wireless signals germane to locating a misplaced user device.

FIG. 3 depicts views 300 that include elements and operations regarding the locating of a user device 102 that has been lost or misplaced. The views 300 are illustrative and non-limiting in nature. Other implementations and variations may also be used.

A coarse location 302 is depicted as "DAVIS OFFICE BUILDING" at a street address of "376 MAIN STREET". The coarse location 302 is that of a lost user device 102(1), and may be determined using signals from one or more navigation satellites 304, one or more cellular towers 306, or other resources external to the lost user device 102(1). Additionally, such a coarse location 302 for the lost user device 102 may be communicated to a server 206 as a normal part of operations performed by the lost user device 102(1), such as during a work-related file upload, access to an online banking service, and so forth.

An approximate location 308 for the lost user device 102(1) is also depicted as "OFFICE #77", which is located within the coarse location 302. The approximate location 308 is more accurate than the coarse location 302—that is, the approximate location 308 encompasses less spatial volume than the coarse location 302. Thus, knowing the approximate location 308 for the lost user device 102(1) reduces the potential area to be searched relative to knowing just the coarse location 302.

The approximate location 308 may be determined using an IP address or other information for a wireless access point 310 that the lost user device 102(1) most recently connected with. For purposes of example, the wireless access point 310 serves only "OFFICE #77" and thus the approximate location 308 is correspondingly limited to a single room. In another instance, an approximate location 308 may include a plurality of rooms, an entire indoor area of a residential address, and so forth. The approximate location 308 may also be communicated to the server 206 as a normal part of lost user device 102(1) operations.

A precise location 312 for the lost user device 102(1) is also depicted as a "CORNER TABLE" that is located within the approximate location 308. The precise location 312 is where the user 108 placed the lost user device 102(1) before inadvertently losing track of it. The search user device 102(2) may guide the user 108 to the lost user device 102(1) by virtue of the beacon signal 112 and the information it may include.

The coarse location 302 or the approximate location 308, or both, may be communicated to the search user device 102(2) from the server 206 in response to a request 210, if either or both of these is or are available. In one or more instances, either the coarse location 302 or the approximate location 308, or both, may be encoded within the beacon signal 112 transmissions. Having either of these bits of information can greatly reduce the search efforts and time required, enabling the user 108 to begin searching relatively close to the actual point where the lost user device 102(1) is waiting. Otherwise, the user 108 is dependent upon a "best guess" approach, having the aid of the beacon signal 112 transmissions.

Figure 4:
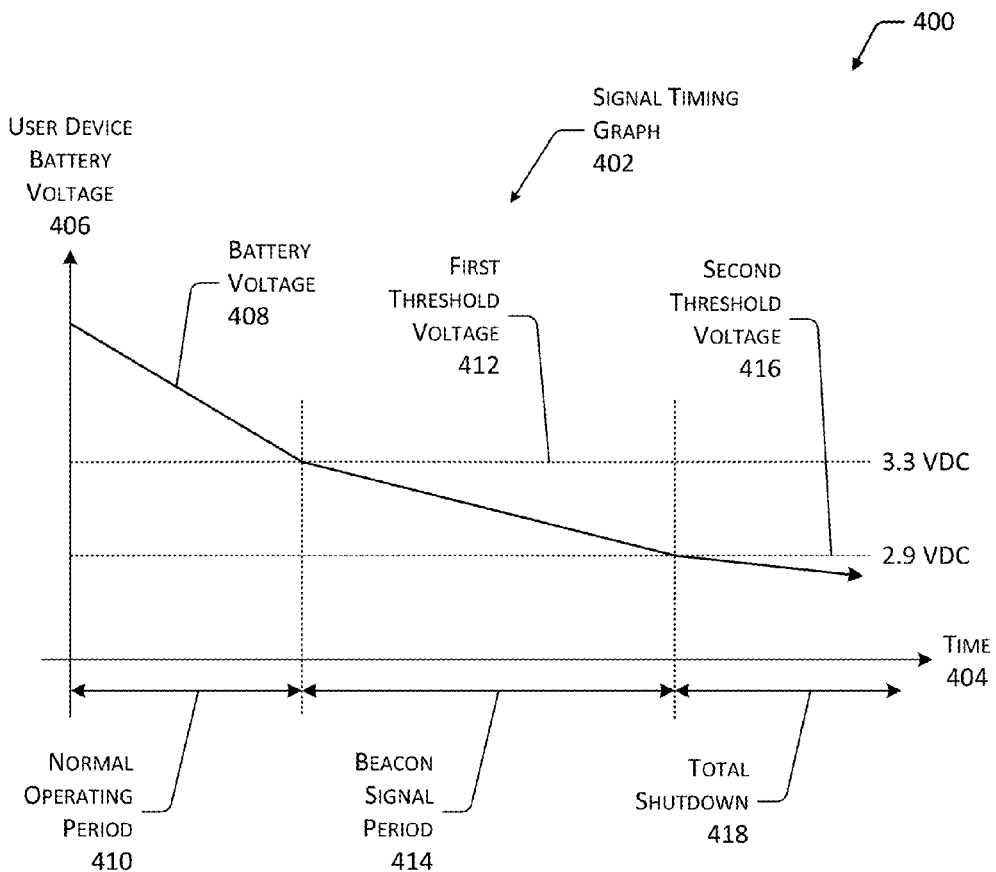
FIG. 4 illustrates a signal timing graph and process steps related to locating a misplaced user device.
Figure 4:
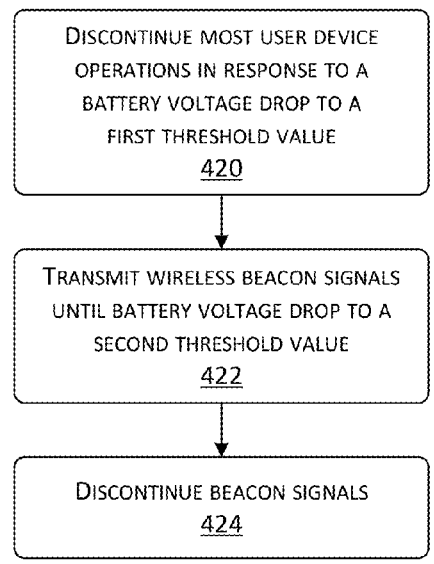

FIG. 4 depicts views 400 including a signal timing graph 402 and related operational steps. The signals, values, step elements, or other aspects of the views 400 are illustrative and non-limiting, and other elements or details may also be used.

The signal timing graph 402 is defined by a time axis 404 and a user device battery voltage axis 406 that is orthogonal thereto. The signal timing graph 402 includes an illustrative battery voltage 408 corresponding to a battery 104 of a user device 102. Specifically, the battery voltage 408 curve depicts the time-dependent voltage of the battery 104 over the course of an illustrative time span. In one example, the battery voltage 408 depicts the voltage of the operating power 114 as directly provided to the RF circuit 116 and the power conditioning 118.

The signal timing graph 402 is characterized by an initial normal operating period 410. During the normal operating period 410, a user device 102 performs various normal operations such as the execution of an application program code, performing cellular based-communications, and so forth. Thus, the battery voltage 408 decreases over time 404 as energy is drawn from the corresponding battery 104.

The voltage of the battery 104 eventually drops or falls to a first threshold voltage 412. For illustration purposes, the first threshold voltage 412 is depicted as 3.3 VDC. Other suitable voltage thresholds may also be used. As the battery voltage 408 crosses the first threshold voltage 412, going forward in time 404, the normal operating period 410 ends and a beacon signal period 414 begins. The processors 122 and the other resources 124 of the user device 102 are inactivated at the beginning of the beacon signal period 414, and remain inactive throughout.

The RF circuit 116 transmits a beacon signal 112 during the course of the beacon signal period 414. The RF circuit 116 may be triggered by a control signal 126 provided by the power conditioning 118 or by one of the processors 122, or otherwise. In another instance, the RF circuit 116 senses the voltage of the battery 104 by way of the operating power 114 and is self-triggered into sending the beacon signals 112. Each transmission of the beacon signal 112 may be performed in accordance with predetermined intervals, may include or encode respective bits of information, and so forth. The beacon signal period 414 may last for several days, depending on the RF broadcast power that is used, the residual energy that may be drawn from the battery 104, or other factors.

The voltage of the battery 104 thereafter drops to a second threshold voltage 416. For illustration purposes, the second threshold voltage 416 is depicted as 2.9 VDC. Other suitable voltage thresholds may also be used. The battery voltage 408 crosses the second threshold voltage 416, continuing to decrease with time 404 due to self-discharge characteristics or other factors. The beacon signal period 414 is now ended, and a total shutdown 418 of the user device 102 is performed and maintained.

The RF circuit 116 is now inactivated and remains so. Thus, the beacon signals 112 are no longer being sent. The power conditioning 118 is also inactivated, if not already so. In essence, all power consuming aspects of the corresponding user device 102 are de-energized in the interest of protecting the battery 104 against some degree of permanent damage or life-cycle degradation. The various resources of the user device 102 may again be activated and used for their respective normal functions, once the battery 104 has been suitably recharged or replaced. Salient aspects of the signal timing graph 402 are depicted by process steps as described below.

Block 420 discontinues most user device 102 operations in response to a battery 104 voltage drop to a first threshold value. For purposes of a present example, the battery 104 of the user device 102 described above drops below 3.3 VDC—the first threshold voltage 412. In response, the processor(s) 122 of the user device 102 cause the other resources 124, and the processors 122 themselves, to shut down and assume an inactivated mode. In one instance, the processors 122 and the other resources 124 are totally electrically de-energized, drawing no power from the battery 104. In another example, the power conditioning 118 is similarly deactivated, as well.

Block 422 transmits wireless beacon signals 112 until the battery 104 voltage drops to a second threshold value. In the present example, the RF circuit 116 draws residual power directly from the battery 104 as the operating power 114. The RF circuit 116 transmits the beacon signals 112, including information regarding the user device 102, in accordance with various parameters such as time interval periods, RF broadcast power, and so forth. Such iterative transmission of the beacon signal 112 continues until the battery 104 voltage drops below 2.9 VDC—the second threshold voltage 416.

Block 424 discontinues the beacon signals 112. In the present example, the RF circuit 116 ceases transmission of the beacon signal 112 in response to the battery 104 voltage drop below 2.9 VDC. The user device 102 is now completely shut down, or essentially so, with any further decrease in the battery 104 voltage attributable to inherent self-discharge or other characteristics.

In one illustrative extension of the process described above, the user device 102 may be located by someone other than the owner or designated user 108, and connected to power so as to recharge. In such a case, the beacon signal 112 transmissions may be discontinued once the battery voltage 408 rises to or above the first threshold voltage 412. Alternatively, the beacon signal 112 transmissions may be discontinued immediately in response to connection to the recharging energy source.

In yet another example, a user device 102 may be configured to send a most recent known location in response to the battery voltage 408 dropping below the first threshold voltage 412, or another threshold voltage greater or lesser than the first threshold voltage 412. Such location information may be sent to a server 206, or to another previously designated user device 102 or apparatus, either directly or by way of the network(s) 208. The location information may be sent or transmitted while the processors 122 or other resources are still operational. Thus, a user device 102 may anticipate the onset of beacon signal 112 operations and send such location-related information so as to aid a search user device 102(2). Other suitable operations may also be performed.

Figure 5:
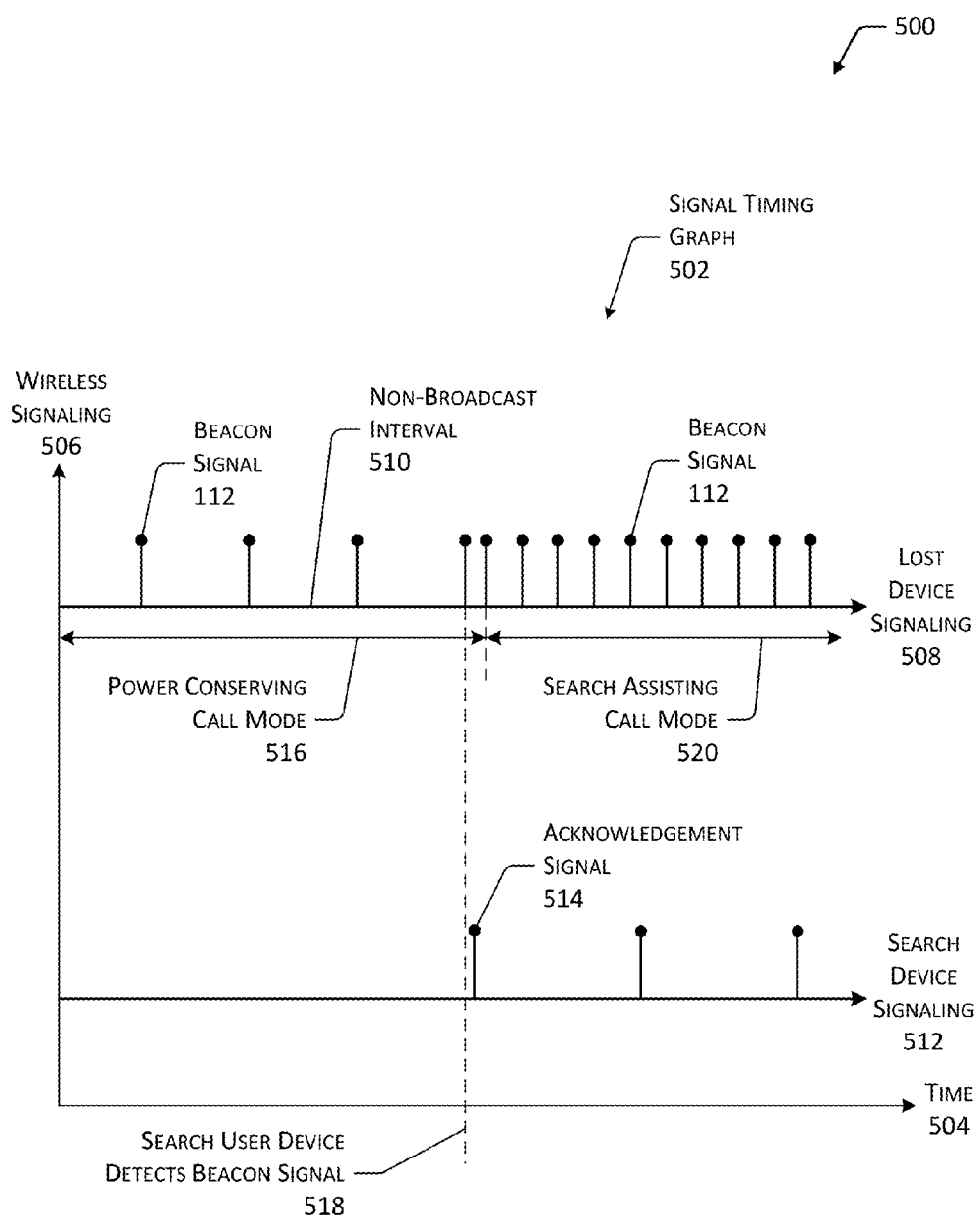
FIG. 5 illustrates a signal timing graph and the transmission of wireless signals used during the locating of a misplaced user device.

FIG. 5 depicts views 500 including a signal timing graph 502 and related characteristics. The signals, values, elements, or other aspects of the views 500 are illustrative and non-limiting, and other elements or details may also be used.

The signal timing graph 502 is defined by a time axis 504 and a wireless signaling axis 506 that is orthogonal thereto. The signal timing graph 502 includes an illustrative lost device signaling 508 trace that includes beacon signal 112 transmissions depicted as discrete events. Each beacon signal 112 transmission may include information regarding a corresponding lost user device 102(1), such as identity coding or naming, location data, an RF signal power value, an instantaneous battery 104 voltage, and so forth. The lost device signaling 508 also includes non-broadcast intervals 510 between consecutive beacon signal 112 transmissions. Thus, the beacon signals 112 are transmitted in time intervals wherein the non-broadcast interval 510 defines the majority of the time of each respective period.

The signal timing graph 502 also includes an illustrative search device signaling 512 trace that includes acknowledgement signal 514 transmissions depicted as discrete events. Each acknowledgement signal 514 is sent from a corresponding search user device 102(2) and may include information that aids in the search. Non-limiting examples of such acknowledgement signal 514 information include a received RF power value, an identity of the search user device 102(2), and so forth.

For purposes of illustration, the lost user device 102(1) is configured to alter one or more parameters of the beacon signals 112 or their transmission rate in response to the acknowledgement signals 514. As depicted, the beacon signals 112 are transmitted in accordance with a first time interval rate during a power conserving call mode 516, such as once every two minutes. This approach allows for prolonged operation from the residual power remaining in the battery 104, thus increasing the likelihood of eventual detection.

The search user device 102(2) detects the beacon signal 112 at an event 518. The search user device 102(2) then transmits a first acknowledgement signal 514 shortly thereafter. The lost user device 102(1) receives the acknowledgement signal 514, and transitions from the power conserving call mode 516 to a search assisting call mode 520. The beacon signals 112 are now transmitted in accordance with a second time interval rate that is shorter than the first time interval rate, such as once every thirty seconds.

The search assisting call mode 520 provides the search user device 102(2) with more frequent beacon signal 112 information, such as the RF signal power value for use in updating the estimated range values. In turn, the user 108 is assisted in expeditiously locating the lost user device 102(1). As further depicted, the search user device 102(2) continues to send acknowledgement signals 514 from time-to-time, causing the lost user device 102(1) to maintain the search assisting call mode 520 for so long as residual power within the battery 104 allows.

Figure 6:
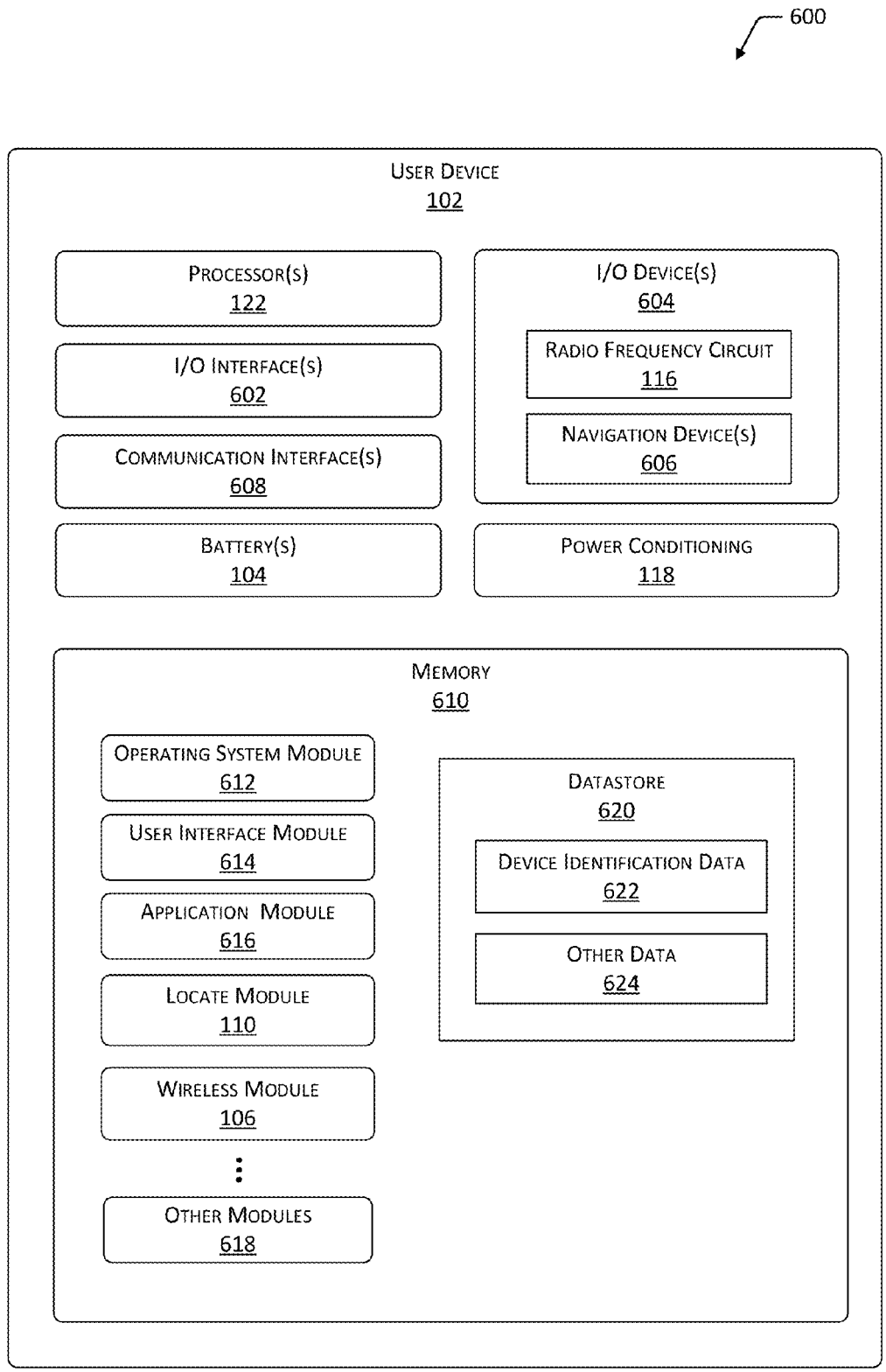
FIG. 6 is a block diagram depicting a user device.

FIG. 6 illustrates a block diagram 600 of a user device 102. The user device 102 is illustrative and non-limiting, and may be defined by a tablet computer, a wearable computer, an e-book reader, a media device, a cellular phone, a laptop computer, or another suitable apparatus. The user device 102 may include one or more processors 122 configured to execute one or more stored instructions. The processor(s) 122 may comprise one or more cores.

The user device 102 may include one or more I/O interface(s) 602 to allow the processor(s) 122 or other portions of the user device 102 to communicate with various other user devices 102, other computing devices, the server 206, web-based resources, and so on. The I/O interfaces 602 may comprise I2C, SPI, USB, RS-232, and so forth.

The I/O interface(s) 602 may couple to one or more I/O devices 604. The I/O devices 604 may include one or more input devices such as a keyboard, a mouse, a microphone, a camera, user input buttons, and so forth. The I/O devices 604 may also include various navigational devices 606 such as a navigation satellite 304 signal receiver, a compass, inertial navigation accelerometers, a cellular tower 306 signal receiver, or other elements or devices respectively configured for use in determining a location or coarse location 302 for the user device 102. The I/O devices 604 may also include output devices such as one or more of a display, audio speakers, haptic output devices, and so forth. In some embodiments, the I/O devices 604 may be physically incorporated within the user device 102, or they may be externally placed.

The user device 102 may also include one or more communication interfaces 608. The communication interfaces 608 are configured to provide communications with other user devices 102, web-based resources, servers 206, routers, wireless access points 310, and so forth. The communication interfaces 608 may include wireless functions, devices configured to couple to one or more networks including PANs, LANs, WLANs, WANs, and so forth.

The user device 102 may also include one or more batteries 104 for providing electrical power during normal operations. The battery or batteries 104 may be rechargeable or disposable in nature. The user device 102 may also include the power conditioning 118. The power conditioning 118 may be configured to receive power from the battery or batteries 104 and to condition or regulate one or more characteristics such as voltage or current, perform noise filtering, and so forth. The resulting conditioned operating power 120 may then be provided to various resources of the user device 102. The user device 102 may also include one or more busses or other internal communications hardware or software that allow for the transfer of data between the various modules and components of the user device 102.

The user device 102 includes one or more memories 610. The memory 610 comprises one or more computer-readable storage media (CRSM). The memory 610 provides storage of computer readable instructions, data structures, program modules, and other data for the operation of the user device 102. The memory 610 may include at least one operating system (OS) module 612. Respective OS modules 612 are configured to manage hardware devices such as the I/O interfaces 602, the I/O devices 604, the communication interfaces 608, and provide various services to applications or modules executing on the processors 122.

Also stored in the memory 610 may be one or more of the following modules. These modules may be executed as foreground applications, background tasks, and so forth. A user interface module 614 may be configured to provide one or more application programming interfaces. The user interface module 614 may be configured to operate with information encoded as hypertext markup language ("HTML") files, extensible markup language ("XML") files, or in another suitable format or language. The user interface module 614 is configured to accept inputs and send outputs using the I/O interfaces 602, the communication interfaces 608, or both.

The memory 610 may also store one or more of the application modules 616. Non-limiting examples of the application modules 616 include a word processing application, a spreadsheet application, a technical drawing or illustrating application, a web browsing application, a portable document viewing application, and so on. The memory 610 may also include the locate module 110 as described above.

The memory 610 may further store a wireless module 106 such that wireless signaling may be communicated to and from the user device 102. In one example, the wireless module 106 includes executable program code, electronic circuitry, or other resources used to control the RF circuit 116 during the transmission of beacon signals 112 or acknowledgement signals 514, and so forth. The memory 610 may also include one or more other modules 618. Non-limiting examples of the other modules 618 may include cellular communications circuitry, a watchdog or other timer, a wireless internet receiver, ports or resources for wired communications, and so forth.

The memory 610 may also include a datastore 620 to store information. The datastore 620 may use a flat file, database, linked list, tree, executable code, or other data structure to store the information. In some implementations, the datastore 620 or a portion of the datastore 620 may be distributed across one or more other user devices 102 or computing devices including servers 206, network attached storage apparatus, and so forth.

The datastore 620 may store device identification data 622, such as a serial number, a user 108 selected device name, or other designations or encoded data values. The device identification data 622 may be included with information that is sent by way of a beacon signal 112, an acknowledgement signal 514, and so on. The datastore 622 may also store other data 624. For example, the other data 624 may include one or more data structures that may be queried, modified, amended, and so forth.

Accordingly, any particular user device 102 may be resourced and configured to act in either a lost mode or a search mode. In a lost mode, the user device 102 may transmit beacon signals 112 in accordance with various parameters or including respective bits of information. In a search mode, the user device 102 may sense or "listen" for beacon signals 112, transmit acknowledgement signals 514, or provide indications or interpretations 214—or any suitable combination of the foregoing—to aid the user 108 in locating a lost user device 102.

Figure 7:
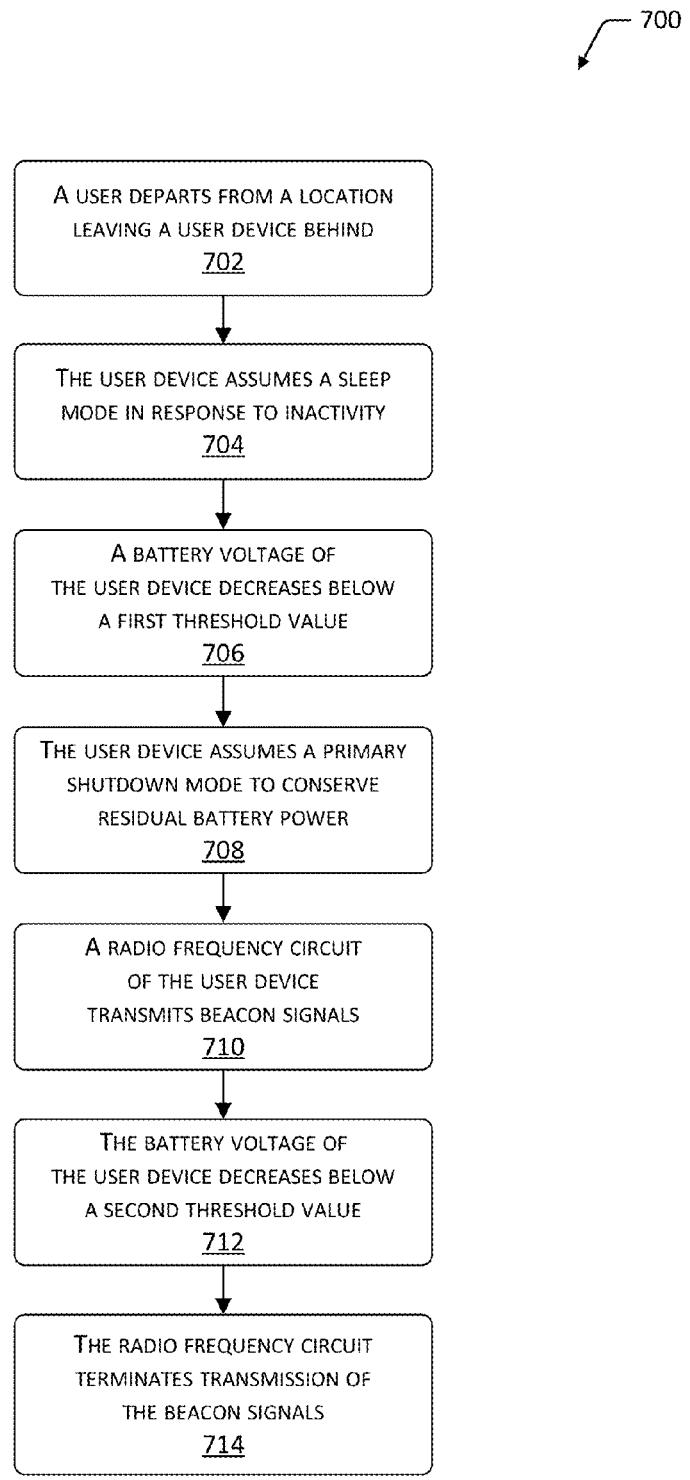
FIG. 7 is a flow diagram of an illustrative process including operations corresponding to respective battery voltages.

FIG. 7 is a flow diagram 700 illustrating a process including transmitting beacon signals 112 from a user device 102(1). The process of the flow diagram 700 is illustrative and non-limiting, and other processes including one or more other steps, omitting one or more of the depicted steps, or proceeding in other orders of execution, may also be used.

Block 702 leaves a user device 102(1) behind as a user 108 departs from that location. For purposes of a present example, the user 108 operates a user device 102(1) in the form of a tablet computer within a professional work environment. The user 108 sets the user device 102(1) down on a desk in a neighboring office space, and unwittingly leaves it there when departing for home for the weekend. For purposes of illustration, it is assumed that the battery 104 of the user device 102(1) is already in a substantially depleted state, exhibiting a voltage of about 3.5 VDC.

Block 704 assumes a sleep mode for the user device 102(1) in response to inactivity. In the present example, the user device 102(1) senses a lack of user 108 input or other relevant activity, and assumes a low power "sleep" mode in the interest of power conservation. However, one or more resources of the user device 102(1) may remain active so as to detect any user 108 input that may occur, to trigger the user device 102(1) back into to an active mode, or to perform other respective functions.

Block 706 decreases a battery voltage 408 of the user device 102(1) below a first threshold value. In the present example, the battery voltage 408 decreases over the course to time 404 due to the non-zero electrical load of the user device 102(1) in sleep mode, as well as self-discharge or other inherent factors. The battery voltage 408 thus drops below a first threshold voltage 412 of 3.3 VDC. The battery 104 now has insufficient electrical energy to provide for the full, active-mode requirements of the user device 102(1).

Block 708 assumes a primary shutdown mode for the user device 102(1) to conserve residual power within the battery 104. In the present example, one or more processors 122 send respective signals causing various resources of the user device 102(1) to become fully inactivated, consuming zero energy. The one or more processors 122 also assume a similar inactivated state. However, an RF circuit 116 of the user device 102(1) remains active and receives operating power 114 directly from the battery 104.

Block 710 transmits beacon signals 112 from a radio frequency circuit 116 of the user device 102(1). In the present example, the RF circuit 116 of the user device 102(1) senses the battery voltage 408 drop below the first threshold voltage 412 and begins sending beacon signals 112 at time intervals according to a predetermined rate. For instance, one beacon signal 112 transmission per minute. Each beacon signal 112 broadcast may include information about the user device 102(1) such as an identification code or name, a most recently determined coarse location 302 or approximate location 308, an RF signal power value, a remaining battery voltage 408 value, and so forth. Other information may also be included. The time interval-based sending of the beacon signals 112 continues so as to aid the user 108 in locating the user device 102(1), for so long as residual power in the battery 104 allows.

Block 712 decreases the battery voltage 408 of the user device 102(1) below a second threshold value. In the present example, the voltage of the battery 104 decreases due to the RF circuit 116 operations, self-discharge, or other factors. The battery voltage 408 eventually drops below a second threshold voltage 416 of 2.9 VDC. Further residual power consumption now carries the risk of damage or life-cycle degradation to the battery 104.

Block 714 terminates transmission of the beacon signals 112 by the RF circuit 116. Concluding the present example, RF circuit 116 senses that the battery 104 has dropped below the second threshold voltage 416 and ceases operation. Thus, the beacon signals 112 are no longer being sent. The user device 102(1) has thus assumed a "full power down mode" in the interest of protecting the battery 104 against undesirable damage or degradation.

Figure 8:
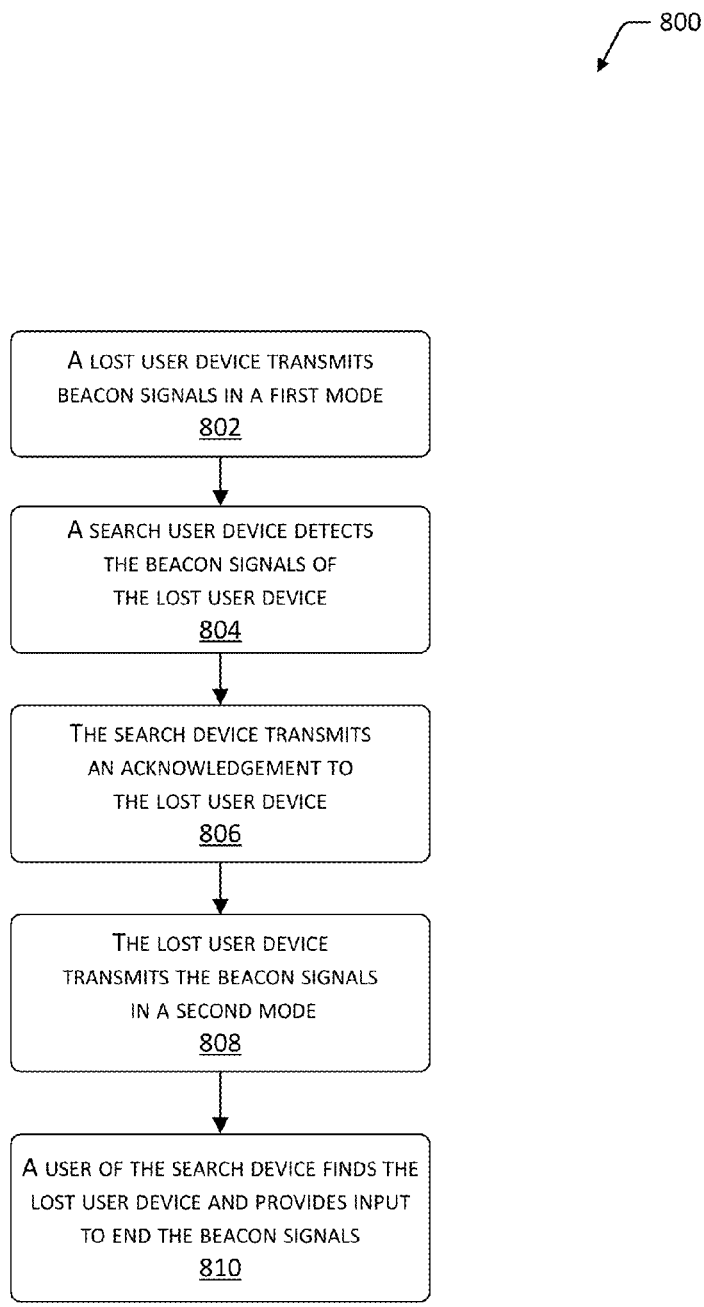
FIG. 8 is a flow diagram of an illustrative process of searching for and locating a misplaced user device.

FIG. 8 is a flow diagram 800 illustrating a process including searching for and locating a lost user device 102. The process of the flow diagram 800 is illustrative and non-limiting, and other processes including one or more other steps, omitting one or more of the depicted steps, or proceeding in other orders of execution, may also be used.

Block 802 transmits a beacon signal 112 from a lost user device 102 in a first mode. For purposes of a present example, a user device 102(1) is misplaced by the user 108, thus becoming "lost". The battery 104 of the lost user device 102(1) drops below a first threshold voltage 412. In response, the one or more processors 122 of the lost user device 102(1) cause various resources thereof to assume a shutdown condition so as to conserve energy. In turn, the RF circuit 116 begins transmitting beacon signals 112 at time intervals defining a first mode. The first mode may be analogous to the power conserving call mode 516.

Block 804 detects the beacon signal 112 of the lost user device 102 using a search user device 102. In the present example, the user 108 realizes that the user device 102(1) has been misplaced, and activates a search function on a user device 102(2). While moving about the most recent areas where the user 108 has been, the search user device 102(2) detects a beacon signal 112 transmission from the lost user device 102(1).

Block 806 transmits an acknowledgement to the lost user device 102(1) from the search user device 102(2). In the present example, the search user device 102(2) sends an acknowledgement signal 514 to the lost user device 102(1), indicating that the most recently sent beacon signal 112 was detected. The acknowledgement signal 514 may also include other information such as a measured RF signal power value, and so forth.

Block 808 transmits the beacon signals 112 from the lost user device 102(1) in a second mode. In the present example, the RF circuit 116 of the lost user device 102(1) receives the acknowledgement signal 514 and transmits the beacons signals 112 at time intervals defining a second mode. The second mode may be analogous to the search assisting call mode 520. As such, the beacon signals 112 are transmitted at shorter time intervals. The search user device 102(2) receives updated information with each detected beacon signal 112, and provides corresponding interpretations 214 to the user 108.

Block 810 finds lost user device 102(1) and the user 108 provides input so as to end the beacon signaling 112. In the present example, the user 108 uses the interpretations 214 presented by the search user device 102(2) to move progressively toward the lost user device 102(1), until it is finally found. The user 108 then presses a power button or other control on the lost user device 102(1) so as to acknowledge recovery. The RF circuit 116 responds to this input by terminating the transmission of the beacon signals 112.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a nontransitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A user device including a processor and a memory storing computer-executable instructions, the user device configured to:
    obtain location information of the user device;
    transmit the location information to a server, wherein the server provides the location information to another device;
    in response to a voltage of a battery of the user device decreasing below a first threshold value:
        discontinue operation of the processor; and
        wirelessly transmit, on one or more occasions, a beacon signal using a first transmission rate, the beacon signal including information regarding the user device, wherein the information includes an identity of the user device and an RF power value used to transmit the beacon signal;
    receive an acknowledgement signal indicative of detection of the beacon signal by a search device;
    wirelessly transmit the beacon signal using a second transmission rate in response to the acknowledgement signal; and
    in response to the voltage of the battery of the user device decreasing below a second threshold value, wherein the second threshold value is lower than the first threshold value, discontinue transmission of the beacon signal.

2. The user device of claim 1, wherein the beacon signal is transmitted using a Wi-Fi® protocol or a Bluetooth® protocol.

3. The user device of claim 1, wherein the user device includes a radio frequency circuit configured to wirelessly transmit the beacon signal independent of the processor.

4. The user device of claim 1, wherein the user device is further configured to:
    wirelessly transmit the beacon signal using the first transmitting rate at successive first time intervals; and
    wirelessly transmit the beacon signal using the second transmitting rate at successive second time intervals in response to the acknowledgement signal, wherein the second time intervals are shorter than the first time intervals.

5. A method performed at least in part by a user device, the method comprising:
    obtaining a first voltage level of a battery of the user device;
    determining that the first voltage level is less than a first threshold value;

de-energizing a processor of the user device based at least in part on the first voltage level of the battery being less than the first threshold value;

based at least in part on the first voltage level of the battery being less than the first threshold value, sending a beacon signal including information regarding the user device, wherein the beacon signal is wirelessly sent by a radio frequency (RF) circuit of the user device, the information includes at least an identifier of the user device and an RF power value used to transmit the beacon signal;

obtaining a second voltage level of the battery of the user device;

determining that the second voltage level is less than a second threshold value; and terminating the sending of the beacon signal in response to determining that the second voltage level is less than the second threshold value.

6. The method of claim 5, wherein the sending the beacon signal comprises transmitting the beacon signal using a Wi-Fi® protocol or a Bluetooth® protocol.

7. The method of claim 5, wherein a first beacon transmitting rate corresponds to sending the beacon signal at first time intervals, and wherein a second beacon transmitting rate corresponds to sending the beacon signal at second time intervals shorter than the first time intervals in response to an acknowledgement signal indicative of detection of the beacon signal by a search device.

8. The method of claim 7, the sending the beacon signal using the first beacon transmitting rate corresponds to sending the beacon signal in accordance with a first RF power level, and wherein the sending the beacon signal using the second beacon transmitting rate corresponds to sending the beacon signal in accordance with a second RF power level different than the first RF power level.

9. The method of claim 5, wherein the information further includes location information of the user device.

10. The method of claim 5, further comprising communicating, from the user device, location information of the user device to a remote apparatus prior to the de-energizing the processor.

11. The method of claim 10, wherein the remote apparatus is a server coupled to a network, the method further comprising communicating, from the server, the location information of the user device to another device.

12. The method of claim 5, wherein the RF circuit is configured to draw operating power directly from the battery of the user device.

13. The method of claim 5, wherein:
the user device includes a power conditioning circuit configured to provide conditioned operating power to one or more power-consuming resources of the user device including one or more of the RF circuit, the processor, a display, audio input or output, a camera, a satellite navigation receiver, or cellular communications resources.

14. The method of claim 13, further comprising sending, by the power conditioning circuit to the RF circuit, a signal indicating that the first voltage level of the battery is less than the first threshold value.

15. The method of claim 5, further comprising:
wherein the RF circuit is further configured to adjust one or more characteristics of at least one of the beacon signal or the information in response to the acknowledgement signal.

16. A user device, comprising:
a battery;
a processor;
a power conditioning circuit configured to cause the processor to be de-energized based at least in part on a first voltage level of the battery being less than a first threshold value;
a radio frequency (RF) circuit configured to transmit an RF beacon signal using a first transmitting rate in response to receiving a first control signal from the power conditioning circuit, wherein the RF beacon signal includes information regarding the user device, the information includes at least an identifier of the user device and an RF power value used to transmit the RF beacon signal, the RF circuit sending the RF beacon signal using a second transmitting rate in response to an acknowledgement signal, the acknowledgement signal indicative of detection of the RF beacon signal by a search apparatus; and
the power conditioning circuit further configured to send a second control signal to the RF circuit based on a second voltage level of the battery being less than a second threshold, the RF circuit terminating transmitting the RF beacon signal in response to the second control signal.

17. The user device of claim 16, wherein the processor is configured to be de-energized in response to receiving the second control signal from the power conditioning circuit.

18. The user device of claim 16, wherein the power conditioning circuit is further configured to draw power from the battery and to provide conditioned operating power to one or more resources of the user device including one or more of the RF circuit, the processor, a display, an audio input or output, a camera, a satellite navigation receiver, or a cellular communications resource.

19. The user device of claim 16, wherein the RF beacon signal includes a voltage value indicative of a voltage level of the battery.

20. The user device of claim 16, wherein the RF circuit is further configured to adjust one or more characteristics of at least the RF beacon signal or the information in response to the acknowledgement signal.

* * * * *